(12) United States Patent
Zuritis

(10) Patent No.: US 12,018,862 B2
(45) Date of Patent: Jun. 25, 2024

(54) INTEGRATED BONDING MID CLAMP DEVICE, SYSTEM, AND METHOD FOR SOLAR PANEL MOUNTING AND GROUNDING

(71) Applicant: Solar Foundations USA, Inc., New Castle, DE (US)

(72) Inventor: Michael Zuritis, Ballston Lake, NY (US)

(73) Assignee: SOLAR FOUNDATIONS USA, INC., New Castle, DE (US)

( * ) Notice: Subject to any disclaimer, the term of this patent is extended or adjusted under 35 U.S.C. 154(b) by 135 days.

(21) Appl. No.: 17/556,028

(22) Filed: Dec. 20, 2021

(65) Prior Publication Data

US 2023/0194126 A1      Jun. 22, 2023

(51) Int. Cl.
| | |
|---|---|
| F24S 25/636 | (2018.01) |
| F16B 39/10 | (2006.01) |
| F16B 43/00 | (2006.01) |
| H02S 20/20 | (2014.01) |
| F24S 25/60 | (2018.01) |

(52) U.S. Cl.
CPC .......... *F24S 25/636* (2018.05); *F16B 39/103* (2013.01); *F16B 43/00* (2013.01); *H02S 20/20* (2014.12); *F16B 2200/93* (2023.08); *F24S 2025/6003* (2018.05)

(58) Field of Classification Search
CPC ....... F16B 39/103; F16B 43/00; F24S 25/636; F24S 2025/6003; H02S 20/20; H02S 30/10

USPC .......................................... 211/41.1; 136/251
See application file for complete search history.

(56) References Cited

U.S. PATENT DOCUMENTS

| | | | | |
|---|---|---|---|---|
| 2,675,844 A * | 4/1954 | Knohl | ...... | F16B 39/24 |
| | | | | 411/164 |
| 8,740,163 B1 * | 6/2014 | Taylor | ...... | F24S 25/636 |
| | | | | 52/173.3 |
| 9,506,600 B1 * | 11/2016 | Li | ...... | H02S 20/23 |
| 9,531,319 B2 * | 12/2016 | Braunstein | ...... | F24S 25/00 |
| 9,643,230 B2 | 5/2017 | Andrews et al. | | |
| 10,992,251 B2 | 4/2021 | Zuritis | | |
| 11,313,591 B1 * | 4/2022 | Atia | ...... | F24S 25/636 |
| 11,811,358 B2 * | 11/2023 | Von Deylen | ...... | H02S 30/10 |
| 11,815,292 B2 * | 11/2023 | Markiewicz | ...... | F24S 25/65 |
| 2011/0036028 A1 * | 2/2011 | Beck | ...... | F24S 25/636 |
| | | | | 52/173.3 |
| 2011/0179606 A1 | 7/2011 | Magno, Jr. et al. | | |
| 2019/0326847 A1 * | 10/2019 | Zuritis | ...... | F16B 5/0685 |
| 2022/0235813 A1 * | 7/2022 | Zheng | ...... | F16B 5/02 |
| 2023/0194126 A1 * | 6/2023 | Zuritis | ...... | F16B 43/00 |
| | | | | 211/41.1 |

* cited by examiner

*Primary Examiner* — Joshua E Rodden
(74) *Attorney, Agent, or Firm* — Schmeiser, Olsen & Watts, LLP

(57) ABSTRACT

Disclosed herein is an integrated bonding mid clamp device for solar panel mounting and grounding, as well as a related system and method. The integrated bonding mid clamp includes a deformable toothed washer for breaking an anodized layer of a solar panel frame. The deformable toothed washer is capable of deforming to avoid obstructing proper contact between the mid clamp and the solar panel frame.

20 Claims, 10 Drawing Sheets

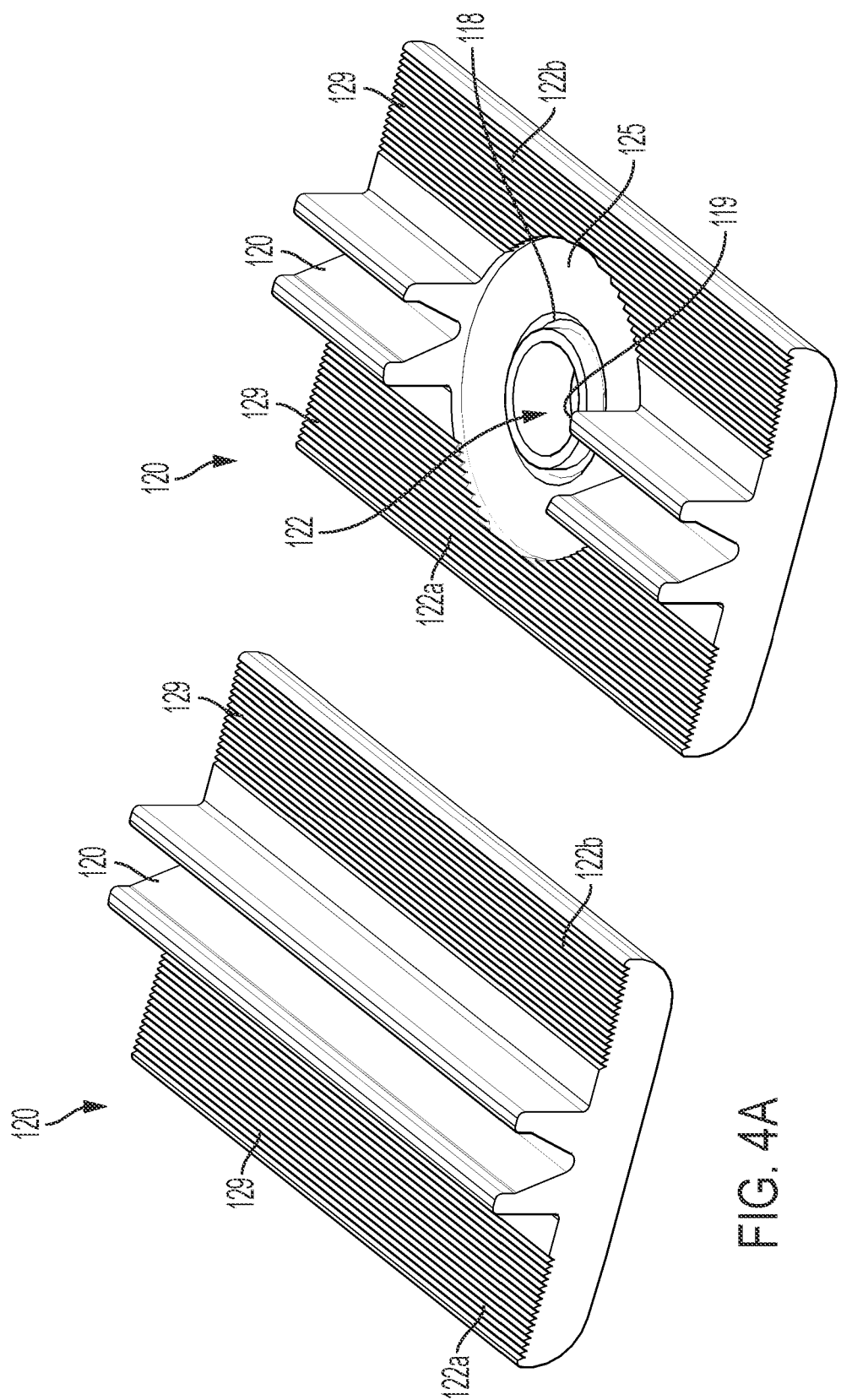

INTEGRATED BONDING MID CLAMP DEVICE, SYSTEM, AND METHOD FOR SOLAR PANEL MOUNTING AND GROUNDING

FIELD OF THE INVENTION

The subject matter disclosed herein relates generally to solar arrays and methods of mounting and grounding the same. More particularly, the subject matter relates to an integrated bonding mid clamp providing electrical contact between a panel frame and a grounding path. A related system and method is also disclosed.

BACKGROUND OF THE INVENTION

Renewable energy sources are becoming more popular with the rising cost of oil and other non-renewable energy resources. Solar energy is one of these renewable energy sources, and has proven desirable to harness in many circumstances. One method of harnessing solar energy is to install a structural array of solar panels, or a solar array, such that the solar panels each face the sun to achieve sunlight absorption.

In order to comply with the National Electrical Code (NEC) and other safety regulations, the solar panels and solar arrays must be properly bonded together and grounded. Typically, solar panels are grounded by attachment to an equipment grounding conductor, such as a heavy gauge copper wire or the like. Solar panels are often surrounded by an aluminum frame having an anodized layer. In many cases, the ground path runs through this anodized aluminum frame, into a support rail, and then into the copper wire or the like. The anodized layer is insulative; therefore when the ground path runs through the anodized aluminum frame, the anodized layer of the frame must be broken to allow electricity to be conducted. Other components, for example, a support rail, may also have an anodized layer. The anodized layer of the support rail may also need to be removed, broken or otherwise pierced, before the ground path runs through the support rail.

Improved mid clamps capable of scratching or otherwise breaking the anodized layer of the panel frame, providing increased contact area between the mid clamp and the solar panel frames, and piercing in a way that causes uniform contact between the clamp and the panel, would be well received in the art.

BRIEF DESCRIPTION OF THE INVENTION

According to one aspect, a ground mount solar array support structure comprises: a first vertical column having a first height extending into a ground; a second vertical column extending into the ground and having a second height, the second height being taller than the first height; a first horizontal beam attached to and extending across a top of the first vertical column; a second horizontal beam attached to and extending across a top of the second vertical column; a mounting rail located above the first and second horizontal beams, the mounting rail further extending between the first and second horizontal beams; a solar panel having a solar panel frame, wherein the solar panel frame has an anodized layer; and a clamping device comprising: a mid clamp portion having a recessed area, the recessed area having a perimeter and a depth, wherein the mid clamp portion includes a mid clamp hole, and wherein the mid clamp portion further includes a raised portion surrounding the mid clamp hole; a deformable toothed washer configured to fit within the perimeter of the recessed area, wherein the deformable toothed washer has projections that extend above the depth of the recessed area when the deformable toothed washer is in a non-deformed state, the deformable toothed washer includes a washer hole that is dimensioned to fit around the raised portion, wherein the raised portion is configured to retain the deformable toothed washer in a proper position with respect to the mid clamp portion prior to clamping; and a tightening mechanism configured to clamp the mid clamp portion to the solar panel frame, wherein the deformable toothed washer is configured to deform into the recessed area when the tightening mechanism clamps the mid clamp portion to the solar panel frame, wherein the projections of the deformable toothed washer are configured to break an anodized layer of the solar panel frame when the tightening mechanism clamps the mid clamp portion to the solar panel frame, wherein tightening of the tightening mechanism secures the solar panel frame to the support rail using the integrated bonding mid clamp device, wherein tightening of the tightening mechanism causes the projections of the deformable toothed washer to break the anodized layer of the solar panel frame, and further wherein tightening of the tightening mechanism causes the deformable toothed washer to deform into the recessed area and transition into a deformed state.

According to another aspect, a clamping device for use with a solar panel array, comprises: a mid clamp portion having a recessed area, the recessed area having a perimeter and a depth, wherein the mid clamp portion includes a mid clamp hole, and wherein the mid clamp portion further includes a raised portion surrounding the mid clamp hole; a deformable toothed washer configured to fit within the perimeter of the recessed area, wherein the deformable toothed washer has projections that extend above the depth of the recessed area when the deformable toothed washer is in a non-deformed state, the deformable toothed washer includes a washer hole that is dimensioned to fit around the raised portion, wherein the raised portion is configured to retain the deformable toothed washer in a proper position with respect to the mid clamp portion prior to clamping; and a tightening mechanism configured to clamp the mid clamp portion to the solar panel frame, wherein the deformable toothed washer is configured to deform into the recessed area when the tightening mechanism clamps the mid clamp portion to the solar panel frame, wherein the projections of the deformable toothed washer are configured to break an anodized layer of the solar panel frame when the tightening mechanism clamps the mid clamp portion to the solar panel frame.

According to another aspect, a method of clamping at least one solar panel frame to a support rail, wherein the method of clamping breaks an anodized layer of at least one solar panel frame, the method comprises: providing a support rail having a channel; providing at least one solar panel frame having an anodized layer; positioning the at least one solar panel frame so that the at least one solar panel frame has a surface that is substantially perpendicular to the support rail; providing a clamping device, the clamping device comprising: a mid clamp portion having a recessed area, the recessed area having a perimeter and a depth, wherein the mid clamp portion includes a mid clamp hole, and wherein the mid clamp portion further includes a raised portion surrounding the mid clamp hole; a deformable toothed washer configured to fit within the perimeter of the recessed area, wherein the deformable toothed washer has projections that extend above the depth of the recessed area when the deformable toothed washer is in a non-deformed state, the deformable toothed washer includes a washer hole that is dimensioned to fit around the raised portion, wherein the raised portion is configured to retain the deformable toothed washer in a proper position with respect to the mid clamp portion prior to clamping; and a tightening mechanism configured to clamp the mid clamp portion to the solar panel frame, wherein the deformable toothed washer is configured to deform into the recessed area when the tightening mechanism clamps the mid clamp portion to the solar panel frame, wherein the projections of the deformable toothed washer are configured to break an anodized layer of the solar panel frame when the tightening mechanism clamps the mid clamp portion to the solar panel frame, inserting the bolt head into the channel of the support rail; passing the threaded shaft through the deformable toothed washer and the mid clamp hole; and tightening the nut on to the threaded shaft to clamp the at least one solar panel frame between the mid clamp portion and the support rail, wherein tightening the nut causes the projections of the deformable toothed washer to break the anodized layer of the at least one solar panel frame, and further wherein tightening the nut causes the deformable toothed washer to deform into the recessed area and transition into a deformed state.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 4A depicts a first manufacturing stage of the mid clamp portion of the integrated bonding mid clamp in accordance with one embodiment;

FIG. 4B depicts a final manufacturing stage of the mid clamp portion of the integrated bonding mid clamp in accordance with one embodiment;

DETAILED DESCRIPTION OF THE INVENTION

A detailed description of the hereinafter described embodiments of the disclosed apparatus and method are presented herein by way of exemplification and not limitation with reference to the Figures.

Figure 1:
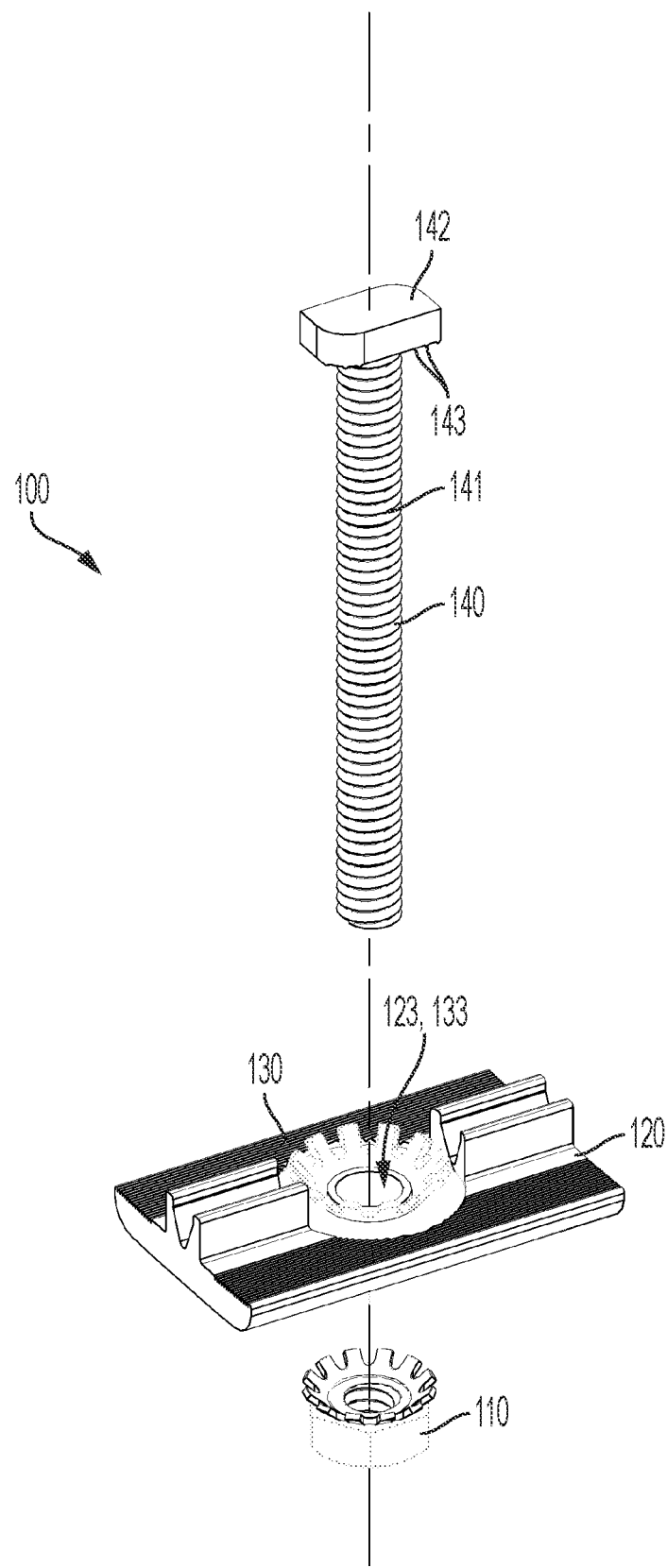
FIG. 1 depicts a partially exploded view of an integrated bonding mid clamp in accordance with one embodiment.
Figure 2:
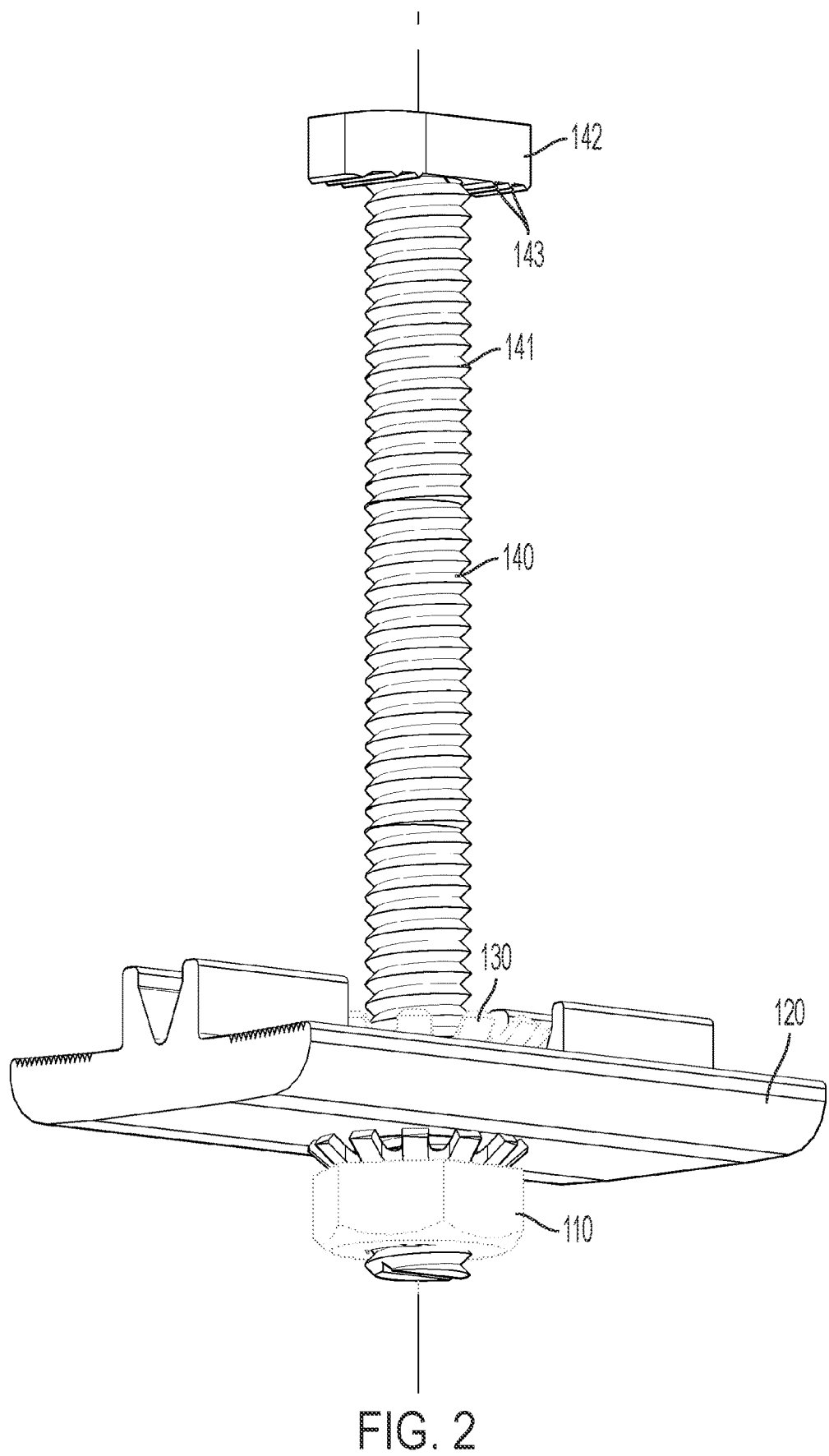
FIG. 2 depicts an assembled view of the integrated bonding mid clamp of FIG. 1 in accordance with one embodiment.

Referring firstly to FIGS. 1 and 2, components of an integrated bonding mid clamp 100 are shown in accordance with one embodiment. In particular, FIG. 1 shows the integrated bonding mid clamp 100 in a partially exploded or unassembled state, while FIG. 2 depicts an assembled view of the integrated bonding mid clamp 100 of FIG. 1. The integrated bonding mid clamp 100 may be a clamping device configured to be tightened to clamp two structural components of a solar array together—namely one or more solar panel frames to a mounting rail of a solar array support structure. The integrated bonding mid clamp 100 shown may be particularly configured to work to bind two solar panel frames.

As will be described in more detail, the integrated bonding mid clamp 100 may be used to fasten one or more solar panel frames to a support rail of a solar array support structure, such as for example a ground mount solar array support structure. The support rail may be a structural component of the ground mount solar array support structure to which a plurality of solar panel frames are mounted atop. The integrating bonding mid clamp 100 may include features which are configured to break an anodized outer layer of the components being clamped thereby. For example, both the solar panel frames and the ground mount solar array support structure rails may be made of aluminum, steel, or like materials capable of conducting electricity. Likewise, both the solar panel frames and the ground mount solar array support structure rails may include an anodized layer configured to provide an insulating layer over the conductive material of a solar panel frame. The integrated bonding mid clamp 100 may be configured to not only clamp the solar panel frame to the top of the solar array support structure in a structurally rigid and secure state, but also do so by breaking through the anodized seal layer to create conduction through the integrated bonding mid clamp 100 and between the solar panel frames and the ground mount solar array support structure rails.

Referring still to FIGS. 1 and 2, the integrated bonding mid clamp may comprise a lock nut 110, a mid clamp portion 120, a deformable toothed washer 130, and a bolt portion 140. The lock nut 110, mid clamp portion 120, deformable toothed washer 130, and bolt portion 140 may all be made of conductive materials in one embodiment. While the lock nut 110 may be a K-lock, it could also be a nylon lock nut or any other style nut. Stainless steel, aluminum, and the like may be used for these components. For example, in one embodiment the lock nut 110, deformable toothed washer 130, and bolt portion 140 may be made of stainless steel or the like, while the mid clamp portion 120 is made of aluminum. The deformable toothed washer 130 is shown in a non-deformed state having already been placed proximate the mid clamp portion 120. However, the deformable toothed washer 130 may be a separate or loose component from to the mid clamp portion 120.

Figure 6:
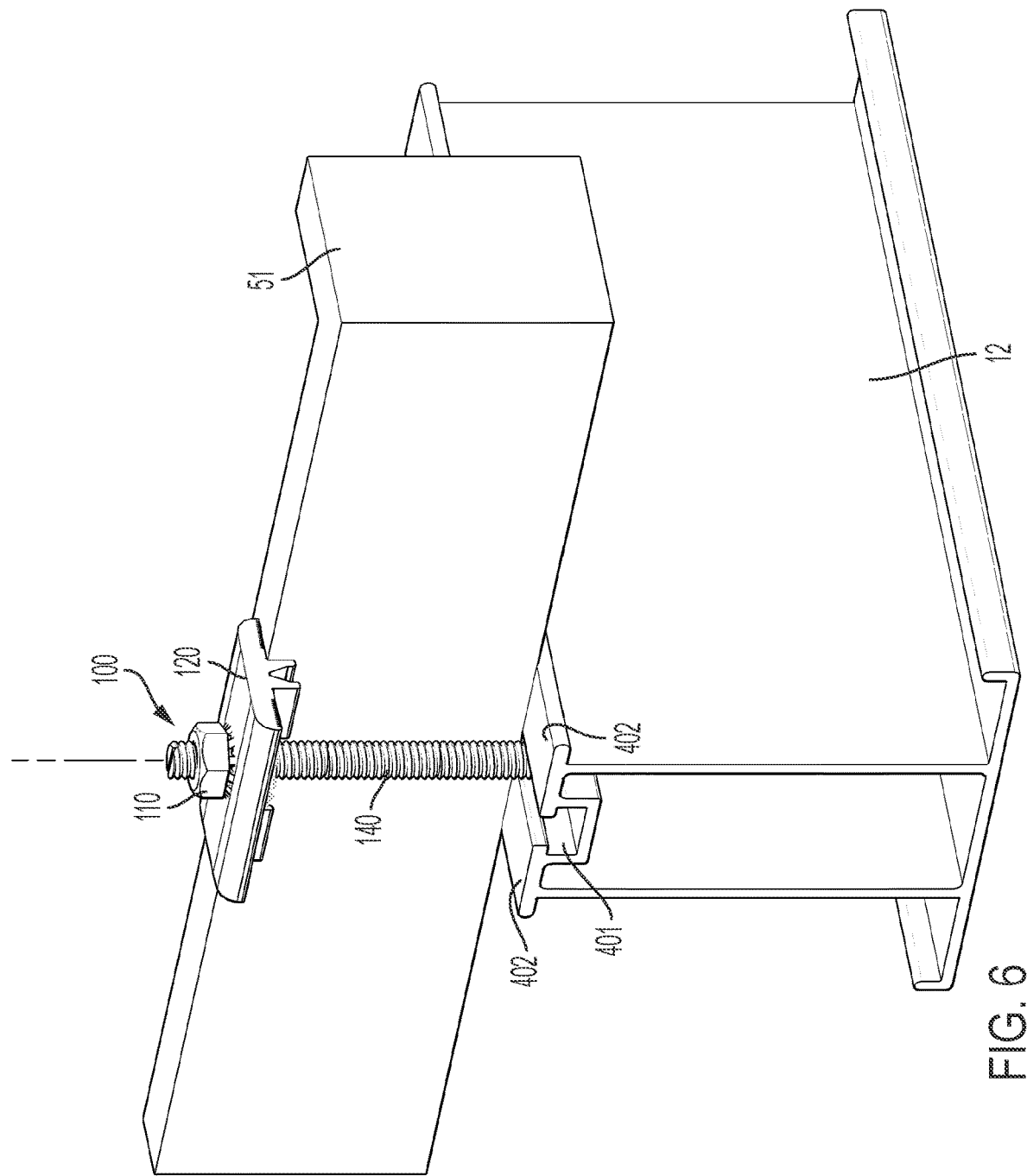
FIG. 6 depicts a perspective view of an integrated bonding mid clamp being used to secure solar panel frames to a support rail wherein a bolt portion of the integrated bonding mid clamp is inserted into a channel of the support rail in accordance with one embodiment.

The bolt portion 140 is shown according to one embodiment. The bolt portion 140 may be a threaded bolt or any other tightening mechanism configured to create a clamping force on the mid clamp portion 120 in the manner described herein. The bolt portion 140 may be configured to have a T-shape. For example, the bolt portion 140 may have a threaded shaft portion 141 and a wider bolt head 142. The threaded shaft portion 141 may be configured so that at least a portion of the threaded shaft portion 141 may extend through the mid clamp hole 123 of the mid clamp portion 120 and the washer hole 133 of the deformable toothed washer 130 when the integrated bonding mid clamp device 100 is assembled and used for fastening solar panel frames to a support rail, as shown in FIG. 6 and described hereinbelow.

The bolt portion 140 may also include a bolt head 142 that is wider than the threaded shaft portion 141 in at least one direction. The bolt head 142 may contain raised ridges or similar features on a side proximate the threaded shaft portion 141, such as the ridges 143. The ridges 143 may be configured to break the anodized layer of a support rail, when the integrated bonding mid clamp device 100 is used to tighten a solar panel frame to a support rail, as shown in FIG. 6 and described hereinbelow. Breaking of the anodized layer of a support rail may be accomplished by a piercing or similar action of the ridges 143 as the integrated bonding mid clamp device 100 is tightened during the clamping of a solar panel frame to a support rail.

Referring still to FIGS. 1 and 2, the lock nut 110 may be threaded. The lock nut 110 may threadably attach to the bolt portion 140 at the threaded shaft portion 142. The lock nut 110 may be tightened by rotational movement down the bolt portion 140 toward the bolt head 142. In the assembled state shown in FIG. 2, the bolt portion 140 is shown extending through the deformable toothed washer 130 and through the mid clamp portion 120. The lock nut 110 may secure the mid clamp portion 120 to the bolt portion 140.

Figure 3:
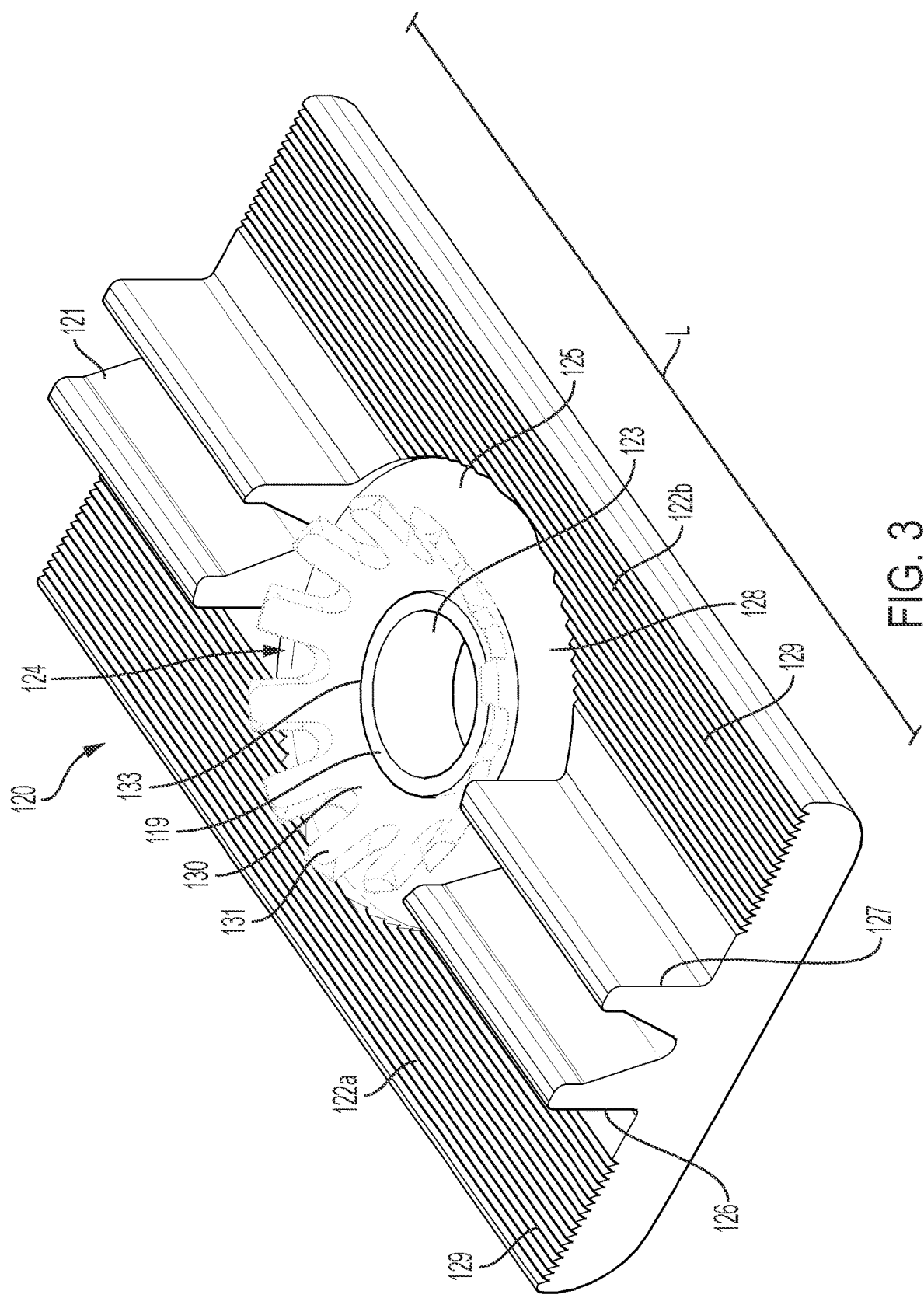
FIG. 3 depicts a perspective view of a mid clamp portion together with the deformable toothed washer of the integrated bonding mid clamp of FIG. 2 in accordance with one embodiment.

Referring now to FIG. 3, the mid clamp portion 120 is shown according to one embodiment together with the deformable toothed washer 130 of the integrated bonding mid clamp 100 of FIG. 1. In the embodiment shown, the mid clamp portion 120 includes a V-shaped middle portion 121 extending lengthwise along a length L of the mid clamp portion 120. The V-shaped middle portion 121 may be configured to occupy a space located between the solar panel frames, in the instance the clamp is configured to clamp two separate solar panel frames.

A first flat portion 122a extends from a first side 126 of the V-shaped middle portion 121 in a direction perpendicular to the length of the V-shaped middle portion 121. A second flat portion 122b extends from a second side 127 of the V-shaped middle portion 121 parallel to the first flat portion 122a. The first and second flat portions 122a, 122b may each include lengthwise ridges 129 which extend along the length L of the mid clamp portion 120. The ridges 129 may be configured to provide further grip for clamping the mid clamp portion 120 to a solar panel frame. Moreover, in some embodiments, the ridges 129 may be configured to additionally break an anodized layer of a solar panel frame to which the mid clamp portion 120 is engaged in a clamped state. The peaks of the ridges 129 of the first and second flat portions 122a, 122b define a parallel clamping surface divided along a length of the mid clamp portion 120 by the V-shaped middle portion 121. The height of the flat clamping surface may share the same plane as the smooth portions of the first and second flat portions 122a, 1222b.

The mid clamp portion 120 may also comprise a mid clamp hole 123. The mid clamp hole 123 may be configured to allow passage of at least a portion of the bolt portion 140 as is described below. The mid clamp portion 120 may further include a circumferential raised portion 119 that circumferentially surrounds the mid clamp hole 123. The raised portion 119 may help guide the deformable tooth washer 130 into the proper position and ensure the deformable tooth washer 130 is centered around the mid clamp hole 123 without becoming jostled out of position during installation. This may help to ensure the integrating bonding mid clamp 100 functions properly after installation.

The mid clamp portion 120 may also have a recessed area 125. The recessed area 125 may be located in the center of the rail portion 121. The recessed area 125 may be circumferential or circular in shape to correspond to the shape of the deformable toothed washer 130. The recessed area 125 may include a substantially flat portion 128 defining a plane extending from an outer perimeter of the recessed area 125 to an inner portion of the recessed area 125. The recessed area 125 may also have a depth 124. In one embodiment, the depth 124 of the recessed area 125 may be the distance from an underside of the corresponding flat portions 122a, 122b to the substantially flat portion 128 inside the recessed area 125.

The recessed area 125 may be configured to accept the deformable toothed washer 130, as shown. The recessed area 125 may be configured so that the deformable toothed washer 130 fits entirely within the recessed area in either a deformed or non-deformed state. For example, the perimeter of the recessed area 125 may be wider than the radius of the deformable toothed washer 130 such that the farthest edge of teeth 131 of the deformable toothed washer 130 are located inside the perimeter of the recessed area 125. The perimeter of the recessed are 125 may be of a size such that the edge of the teeth 131 or projections of the deformable toothed washer 130 are flush with the perimeter when the deformable toothed washer 130 is in a deformed or non-deformed state. Further, the perimeter of the recessed area 125 may be a size such that the farther edge of at least one of the projections or teeth 131 fits within the perimeter in either a deformed or non-deformed state.

FIG. 4A depicts a first manufacturing stage of the mid clamp portion 120, while FIG. 4B depicts a final manufacturing stage of the mid clamp portion 120, in accordance with one embodiment. At the first stage shown in FIG. 4A, the mid clamp portion 120 has been formed via an initial forming process, such as by extrusion, casting and/or cutting. In the embodiment shown, the ridges 129 may be formed on the first and second flat portions 122a, 122b via a separate process (e.g. a stamping process) or by the same process that creates the initial shape of the mid clamp portion 120 shown in FIG. 4A.

As shown in FIG. 4B, the mid clamp hole 123 has been formed in the mid clamp portion 120. The mid clamp hole 123 maybe created via a drilling process, for example. Moreover, the recessed area 125 has also been created. The recessed area 125 extends from an outer circumference toward the mid clamp hole 123. The raised portion 119 has also been formed so that the raised portion 119 extends circumferentially around the mid clamp hole 123. The raised portion 119 may extend to the same height as the surface of the first and second flat portions 122a, 122b. In other embodiments the raised portion 119 may be raised higher than the clamping surface defined by the first and second flat portions 122a, 122b. In still other embodiments, the raised portion 119 may be raised lower than the clamping surface defined by the first and second flat portions 122a, 122b, but still raised relative to the recessed area 125. Still further, the mid clamp portion 120 is shown including a circumferential channel 118 extending circumferentially around the outer circumference of the raised portion 119. The circumferential channel 118 may be a channel that is recessed more deeply than the recessed area 125, thereby defining a circular or circumferential channel between the recessed area 125 and the raised portion 119. The circumferential channel 118 may be configured to receive a projecting annular lip of the deformable toothed washer 130 in order to further retain the deformable toothed washer 130 in proper position or alignment during clamping.

Figure 5A:
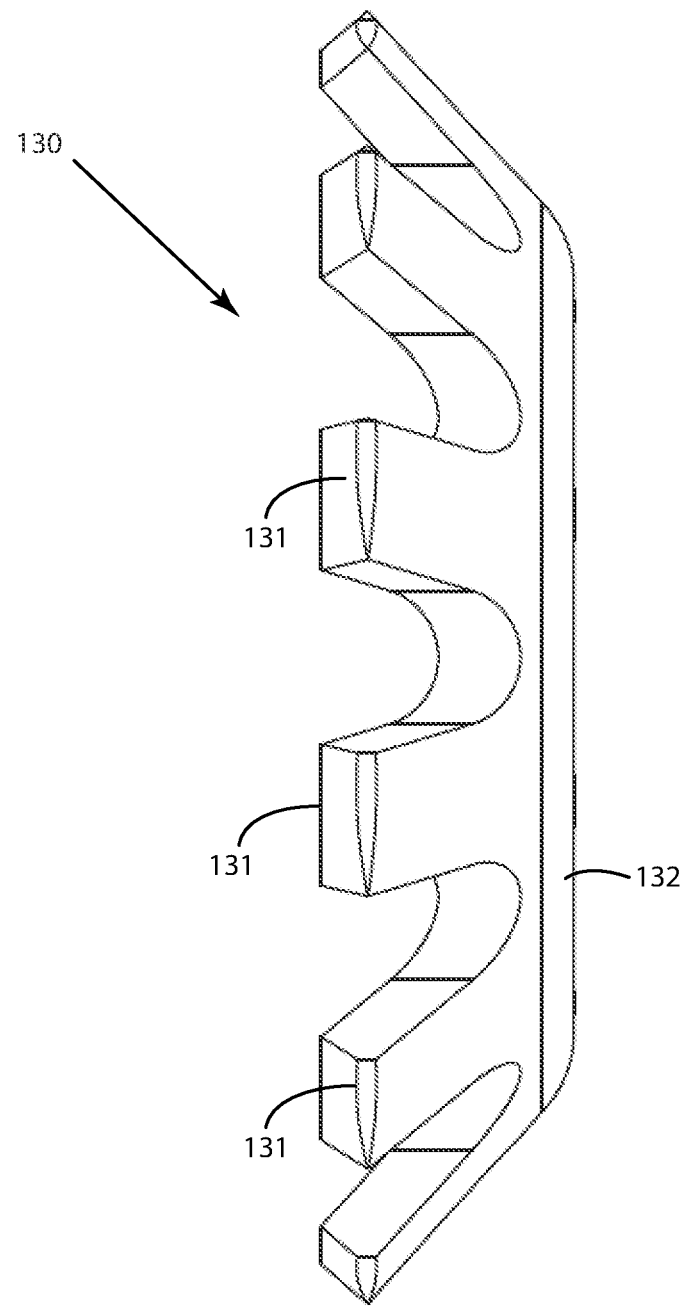
FIG. 5A depicts a side perspective view of the deformable toothed washer of FIG. 3B in accordance with one embodiment.
Figure 5B:
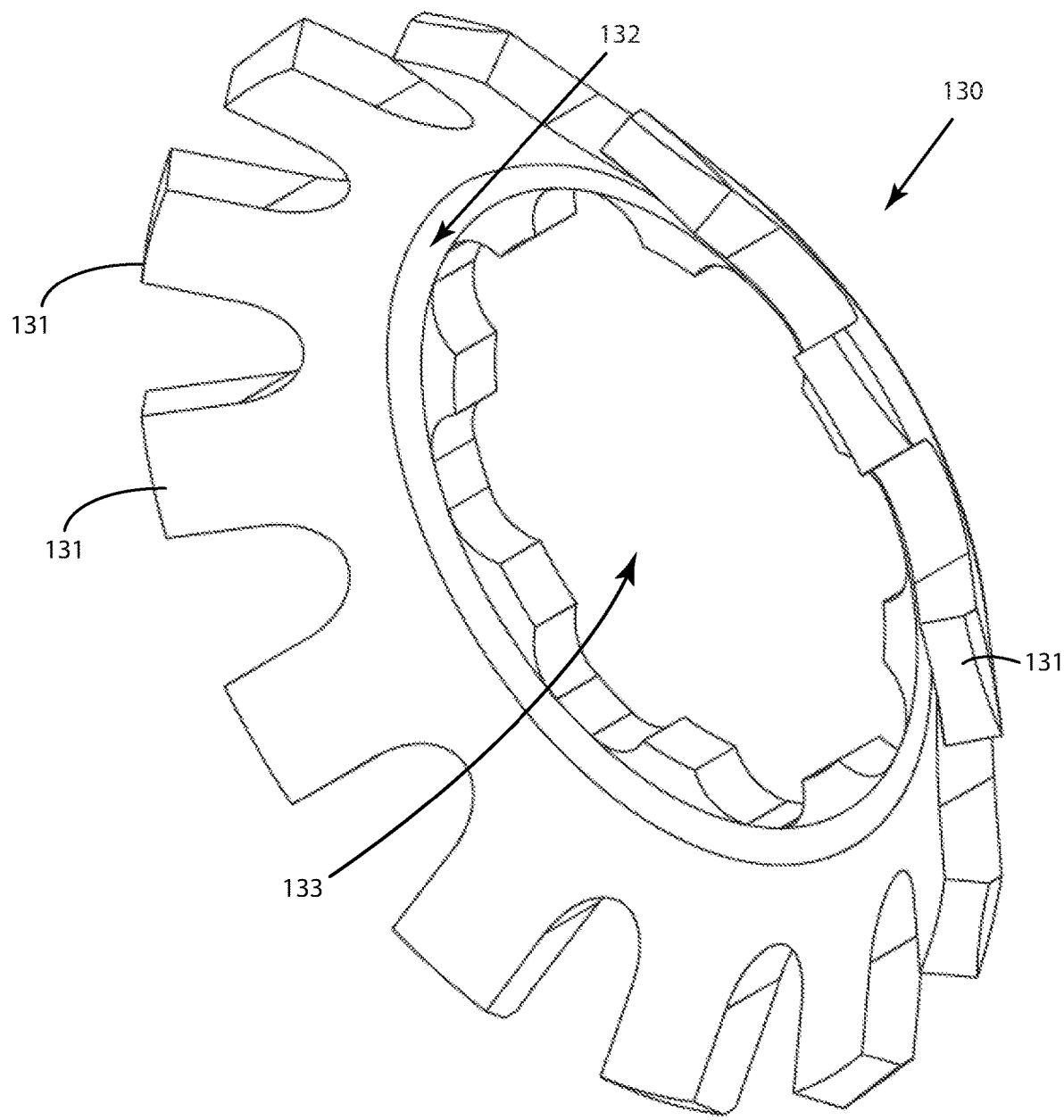
FIG. 5B depicts a front perspective view of the deformable toothed washer of FIG. 3, in accordance with one embodiment.

Referring now to FIGS. 5A and 5B, the deformable toothed washer 130 is shown in a non-deformed state according to one embodiment of the invention. The deformable toothed washer 130 may be a deformable counter sunk external tooth lockwasher or the like. Referring to FIG. 5A, a side view of the deformable toothed washer 130 is shown in a non-deformed state. The deformable toothed washer 130 may have a truncated conical shape as shown. For example, the deformable toothed washer 130 may include a plurality of projections or teeth 131 extending outward from a central round or annular area 132 which may take the form of a projecting annular lip. The central round or annular area 132 or annular lip may have cutouts or other features for saving material, improving strength, etc. As shown in FIG. 4B, the central round or annular area 132 may form or include a washer hole 133. In particular, the annular area 132 may be particularly dimensioned to surround the raised portion 119 and fit within the circumferential channel 118 of the mid clamp portion 120. The washer hole 133 may be configured to substantially align with the mid clamp hole 123 of the mid clamp portion 120 and may permit passage of at least a portion of the bolt member 140 as is described in more detail below. The projections or teeth 131 may extend substantially radially outward from the center round or annular area 132 but may be angled to give the deformable toothed washer 130 a truncated conical shape.

The projections or teeth 131 may be configured to break the anodized layer of a solar panel frame. For example, the projections or teeth 131 may be capable of breaking the anodized layer by scraping, ripping, scratching, tearing, cutting, piercing, and the like. The projections or teeth 131 may have sharpened or angled edges, further tooth projections, and the like configured to more efficiently break the anodized layer.

Referring back to FIG. 3, when the deformable toothed washer 130 is in a non-deformed state and placed within the area defined by the recessed area 125 and the circumferential channel 118 of the mid clamp portion 120, the edges of the projections or teeth 131 may extend outward from the substantially flat plane inside the recessed area 125, i.e., they may extend outward from the depth 124 of the recessed area 125. Contrarily, the center round or annular portion 132 may be in contact with the mid clamp portion 120 within the circumferential channel 118. In this position, the projections or teeth 131 may extend past the depth 124 of the recessed area 125. For example, when the deformable toothed washer 130 is in a non-deformed state and placed into the recessed area 125, the projections or teeth 131 may extend out of the depth 124 of the recessed area 125 when the center round or annular portion 132 is in contact with (is flush with) the recessed area 125, i.e., the projections or teeth 131 may protrude out of the recessed area 125 such that they extend out past the underside of the corresponding flat portions 122a, 122b. Even when the projections or teeth 131 protrude out past the depth 124 of the recessed area 125, one or more of the projections or teeth 131 or portions thereof may still be located within the perimeter of the recessed area 125. Further, when the projections or teeth 131 protrude out past the depth 124 of the recessed area 125 in the depth direction, the entirety of the deformable toothed washer 130 may still be located within the perimeter of the recessed area 125 when viewed from a downward looking top view.

FIG. 6 depicts the integrated bonding mid clamp 100 in use to secure a solar panel frame 51 to a support rail 12. While the integrated bonding mid clamp 100 is shown securing a single solar panel frame 51 to a support rail 12, it should be understood that the integrated bonding mid clamp 100 may be particularly configured to secure two solar panel frames to the support rail 12. One has been removed in the view shown in order to reveal the connection.

When the integrated bonding mid clamp device 100 is in use, the bolt head 142 of the bolt portion 140 may be placed into a channel 401 of the support rail 12 so that the bolt head 142 is retained in the channel 401. The solar panel frame 51 may be placed across top surfaces 402 of the support rail 12 located on each side of the channel 401, substantially perpendicular to the support rail 12. While not shown, a second solar panel frame may be located on the opposite side of the bolt portion 140 than the solar panel frame 51 shown in FIG. 6, so that the integrated bonding mid clamp 100 is configured to clamp two solar panel frames simultaneously—one with the first surface 122a of the mid clamp portion 120 and one with the second surface 122b of the mid clamp portion 120. The deformable toothed washer 130 may be placed, in a non-deformed state, on the bolt portion 140 so that the threaded shaft portion 141 passes through the washer hole 133. The mid clamp portion 120 may also be placed on the bolt portion 140 and the deformable toothed washer 130 such that the deformable toothed washer 130 is situated in the recessed area 125 whereby the annular area 132 is located within the circumferential channel 118 of the mid clamp portion 120. In this position, the V-shaped middle portion 121 extends parallel and is in contact with the adjacent solar panel frames 51 being clamped. In the case of clamping two solar panel frames, the V-shaped middle portion 121 separates the two frames by an amount equivalent to the space between the first side 126 and the second side 127 of the V-shaped middle portion 121. The undersides of the corresponding flat portions 122a rests on the solar panel frame 51, and the threaded shaft portion 142 of the bolt portion 140 extends through the mid clamp hole 123 of the mid clamp portion 120. The lock nut 110 may be placed on the threaded shaft portion 142 of the bolt portion 140 above the mid clamp portion 120. In embodiments where two solar panel frames are clamped simultaneously, the second flat portion 122b would be resting on the second solar panel frame on the opposite side of the bolt portion 140.

The lock nut 110 may be tightened by rotational activation. The tightening of the lock nut 110 may force the mid clamp portion 120 downward onto the solar panel frame 51, and the solar panel frame 51 downward onto the support rail 12. The corresponding flat portions 122a, 122b of the mid clamp portion may likewise be forced downward onto the solar panel frames 51 clamped therebetween.

As the lock nut 110 is tightened and the integrated bonding mid clamp device 100 forces the solar panel frames 51 and the support rail 12 together, the projections or teeth 131 of the deformable toothed washer 130 may break the anodized layer of the solar panel frames 51 clamped by the integrated bonding mid clamp 100. Breaking may be accomplished by contact between the projections or teeth 131 of the deformable toothed washer 130 and the anodized layer of the solar panel frames 51 during tightening. For example, the projections or teeth 131 may scrape, rip, scratch, tear, cut, or otherwise break the anodized layer of the solar panel frames 51. Similarly, as the lock nut 110 is tightened and the integrated bonding mid clamp device 100 forces the solar panel frames 51 and the support rail 12 together, the ridges 143 of the bolt head 142 may break the anodized layer of the support rail 12. For example, the ridges 143 may pierce or otherwise break the anodized layer of the support rail 12.

As tightening occurs, the deformable toothed washer 130 may also be pressed into a deformed state. In the deformed state, one or more of the projections or teeth 131 of the deformable toothed washer 130 may be pushed back toward the plane of the center round or annular portion 132 and the washer hole 133. For example, the deformable toothed washer 130 may deform from the truncated conical shape into a shape that is flatter, i.e., a shape that more closely approaches a flat disk shape or in which one or more of the projections or teeth 131 are flatter. The one or more projections or teeth 131 pushed back may be pushed back so that they are located within the depth 124 of the recessed area 125 of the mid clamp portion 120. When in the deformed state, the one or more projections or teeth 131 of the deformable toothed washer 130 which are pushed back may extend more substantially radially outward from the center round or annular portion 132, and have a shallower angle, i.e., the deformable toothed washer 130 may have a less conical shape when compared to the non-deformed state, at least with respect to the one or more projections or teeth 131 which are pushed back.

When the deformable toothed washer 130 is in the deformed state, the deformable toothed washer 130 may still be located entirely within the perimeter of the recessed area 125. Further, as shown in FIG. 6A, the deformable toothed washer 130 may also be entirely within the depth 124 of the recessed area 125 when in the deformed stated; thus, the deformable toothed washer 130 does not impede contact between the mid clamp portion 120 and the solar panel frames 51 which are being clamped by the integrated bonding mid clamp 100. When the deformable toothed washer 130 is in the deformed state, the center projections or teeth 131 may not flatten. However, the deformable toothed washer 130 still does not impede contact between the mid clamp portion 120 and the solar panel frames 51 because the center projections or teeth 131 may be located in the space between the solar panel frames 51.

Further, contact between the integrated bonding mid clamp 100 and the solar panel frames 51 is not limited to the projections or teeth 131 of the deformable toothed washer. Instead, the undersides of corresponding flat portions 122a, 122b of the mid clamp portion 120 may fully contact the solar panel frames 51, respectively, following deformation of the deformable toothed washer 130. These undersides may include additional protrusions, such as the lengthwise ridges which may be configured to aid in gripping the solar panel frames 51 being clamped and/or additionally creating electrical conductivity via the contact.

The integrated bonding mid clamp 100 may be used to attach, mount, and/or ground solar panels and solar panel arrays in one embodiment.

The integrated bonding mid clamp 100 may be used as part of a system for attaching, mounting, bonding solar panels and solar panel arrays. The system may include support rails such as the support rail 12 described above. The system may also include panel frames such as the panel frames 51 described above. The system may also include additional components for attaching, mounting, and/or grounding such as the copper wire described above and other components used to continue the path to ground.

Figure 7:
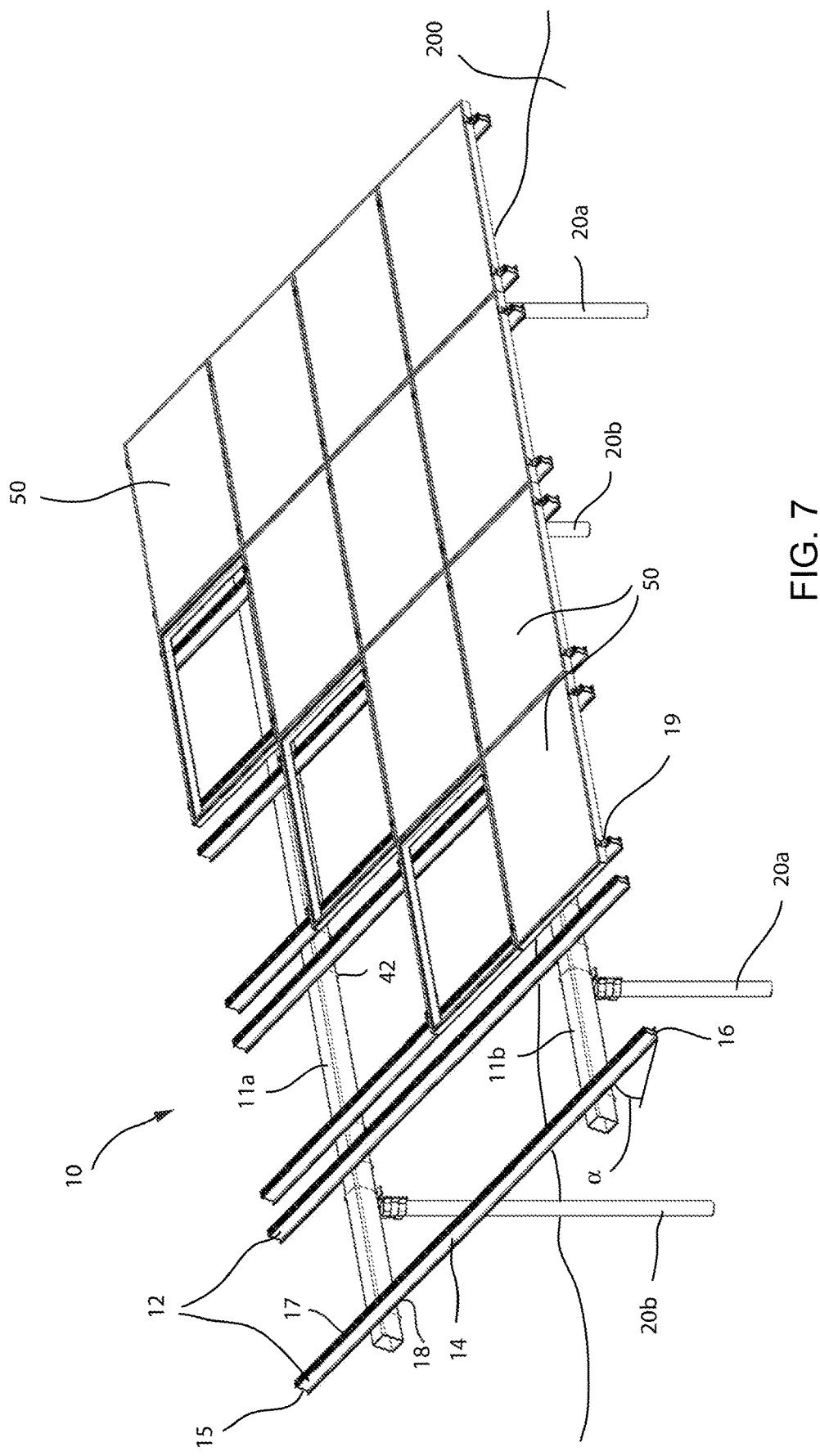
FIG. 7 depicts a ground mount solar array support structure in accordance with one embodiment.

With reference to FIG. 7, a perspective view of a solar array support structure that includes a plurality of the vertical columns of FIGS. 1 and 2 is shown in accordance with one embodiment. A plurality of vertical columns 20 are shown installed in the ground 200 with a solar array support structure 10 secured thereon according to one embodiment. The solar array support structure 10 includes a plurality of supporting mounting rails 12 each include a main body having a top 17 and a bottom 18. The main body 14 extends from a first main body end 15 to a second main body end 16. The mounting rail 12 may have a dual web cross section that includes a first vertical element and a second vertical element. Furthermore, the mounting rail 12 may include a channel that extends along the top 17 that is configured to retainably receive an attachment mechanism 19 for attaching a solar panel 50 to the mounting rail 12. Each of the solar panels 50 may be surrounded by a solar panel frame 51. The mounting rail 12 may have a first flange and a second flange extending from the bottom of the first and second vertical elements respectively, each flange having a pair of openings configured to receive a two ends of a U-bolt. Thus, the mounting rail 12 may be securely attached directly to two horizontal beams 11a, 11b with the U-bolts. The various components of the solar array support structure 100 may be manufactured from aluminum, steel, stainless steel or other like materials that are robust enough to support the solar panels 50.

In the embodiment shown, a plurality of front vertical columns 20a extend substantially vertically from the ground to a bottom horizontal beam 11b, while a plurality of rear support columns 20b extend substantially vertically from the ground to a top horizontal beam 11a. The top and bottom horizontal beams 11a, 11b may be at respective heights such that when several of the mounting rails 12 are attached thereto, they extend above the ground at a predetermined angle α. The solar array support structure 10 is not limited to the embodiment shown in FIG. 4, and may have a different configuration. For example, the solar array support structure 10 may have more or less than four vertical columns 20. As another example, the solar array support structure 100 may be automatically adjustable in tilt and height with telescopic rails and columns. Many other embodiments would be apparent to those skilled in the art. Whatever the construction of the solar array support structure 10, the vertical columns 20 and horizontal beams 11 are configured to hold the mounting rails 12 above the ground when the solar array support structure 10 is installed.

Figure 8:
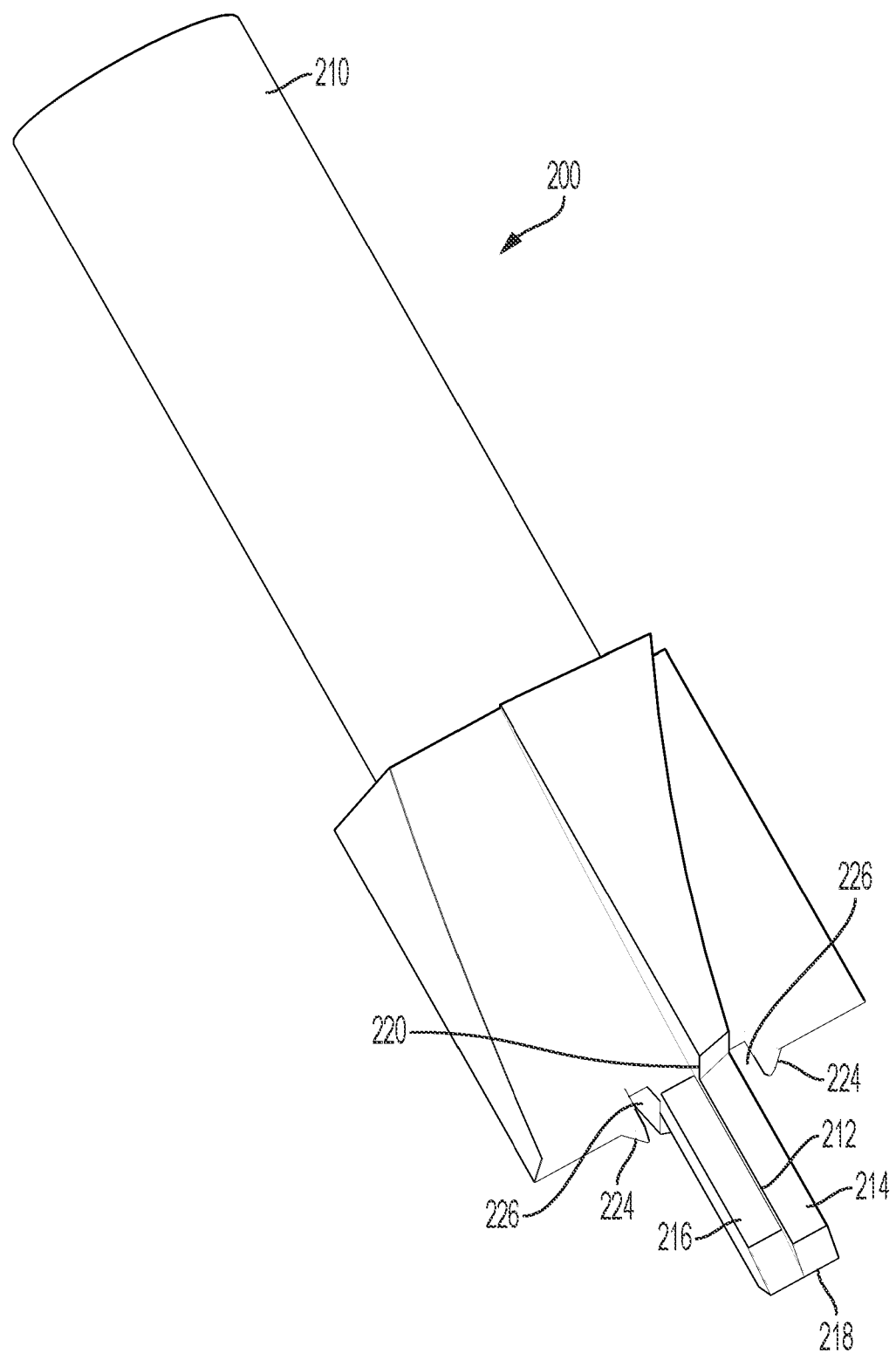
FIG. 8 depicts a perspective view of a tool for forming the mid-clamp portion of the integrated bonding mid clamp as shown in FIGS. 1, 2, 3 and 4B.
Figure 9:
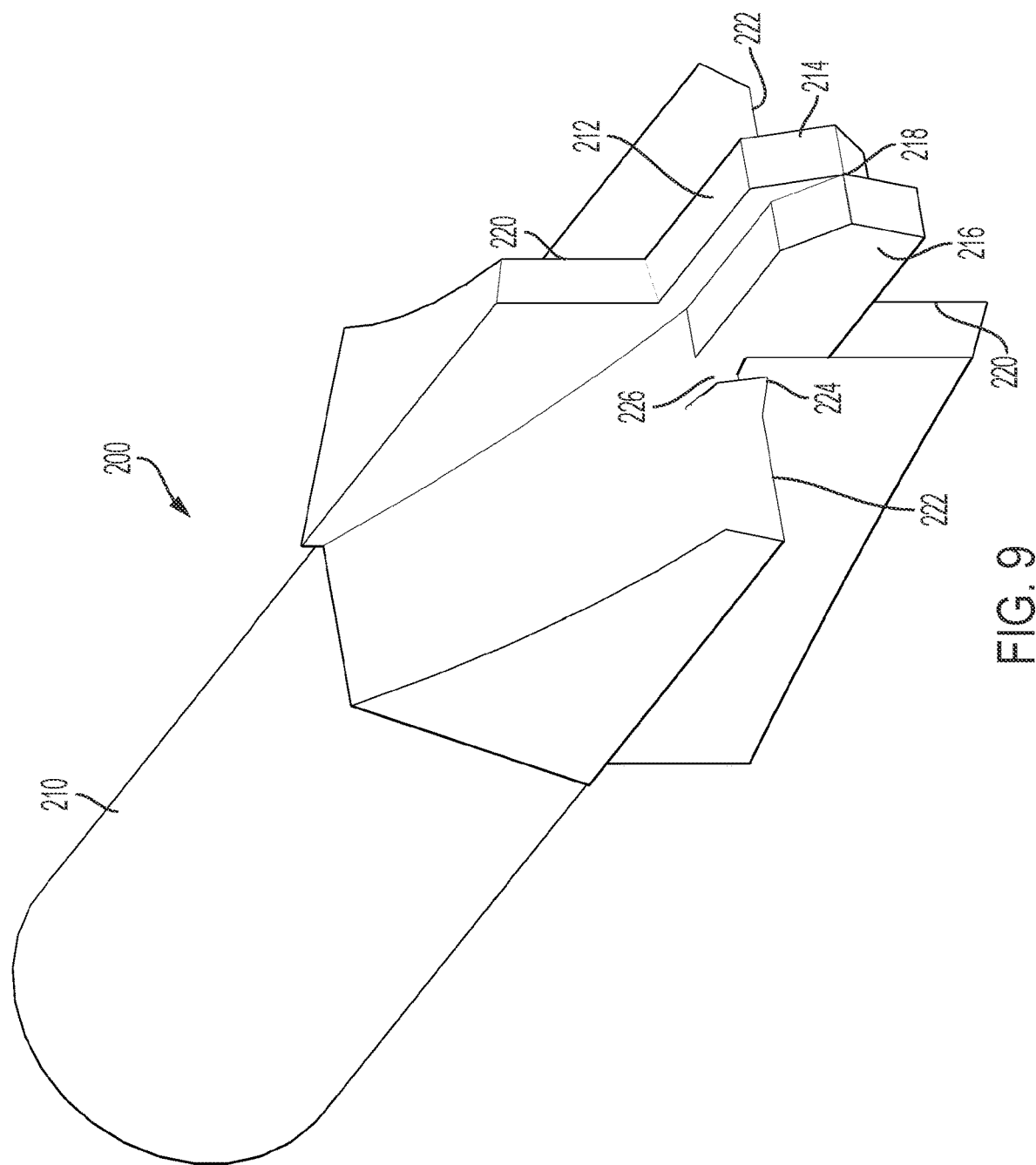
FIG. 9 depicts another perspective view of the tool of FIG. 8.

FIG. 8 depicts a perspective view of a tool 200 for forming the mid clamp portion 120 as shown in FIGS. 1, 2, 3 and 4B. FIG. 9 depicts another perspective view of the tool 200 of FIG. 8. The tool 200 may be a drill bit which may be customized in order to create the structure shown in FIG. 4B in the mid clamp portion 120 from the starting piece as shown in FIG. 4A. The tool 200 may be attached to a machine configured to rotate a shaft 210 the tool 200. The tool 200 includes a tip 212 having two staggered portions 214, 216 extending to a single tip edge 218. The tip 212 may be configured to drill and bore out the mid clamp hole 123 of the mid clamp portion 120, shown in FIG. 4B.

The tool 200 includes at least one edge 220 configured to fashion, cut or otherwise drill the top edge of the circumference of the raised portion 119. As shown in FIG. 9, the tool 200 may include two edges 220 which are located across from each other extending from the base of the tip 212. The edges 220 may further contribute to the creation of the recessed area 125, as the raised portion 119 may be co-planar to the recessed area 125.

Perpendicular to the two edges 220 are two additional portions 222 extending from the base of the tip 212. The additional portions 222 may include edges which further contribute to the creation of the recessed area 125. Further, the additional portions 222 include an extending protrusion 224 configured to create the circumferential channel 118 extending around the raised portion 119. An open space 226 immediately proximate the base of the tip 212 prevents the additional portions 222 from creating the raised portion 119, the creation of which is left to the edges 220.

Thus, the tool 200 includes a stepped tip 212 which extends to a base whereby a cross or X-shaped profile is configured to cut the mid clamp portion 120 as shown in FIG. 4B with a single lowering of the rotating tool 200 into the mid clamp portion 120.

The integrated bonding mid clamp 100 may be used in methods of clamping a solar panel frame to a support rail and/or methods of installing a solar array support structure such as a ground mount solar array support structure. Methods may include providing grounding as described above such as by breaking an anodized layer of a panel frame as part of a path to ground.

Methods contemplated herein may include the step of providing a support rail such as the support rail 12. The support rail may have a channel such as the channel 401. The support rail may also have one or more raised portions such as the raised portions 402.

Methods may also include the step of providing one or more solar panel frames such as the solar panel frame 51 described above. The one or more solar panel frames may have an anodized layer as described above.

Methods may also include the step of positioning the solar panel frames such that the two solar panel frames are separated by a space, such as the space 250 described above. Further the solar panel frames may be positioned so that each solar panel frame has a surface that is substantially perpendicular to the support rail.

Methods may also include the step of providing a clamping device such as the integrated bonding mid clamp 100 described above. The clamping device may comprise a mid clamp portion such as the mid clamp portion 120 described above. The clamping device may also comprise a deformable toothed washer such as the deformable toothed washer 130 described above. The clamping device may also comprise a bolt portion such as the bolt portion 140 described above. The clamping device may also comprise a lock nut such as the lock nut 110 described above.

Methods may also comprise the steps of inserting the bolt head into the channel of the support rail, such that the threaded shaft extends from the channel of the support rail in between the two solar panels, passing the threaded shaft through the round washer hole and the mid clamp hole, and tightening the lock nut on to the threaded shaft to clamp the solar panel frame between the mid clamp portion and the support rail; wherein tightening the lock nut causes the projections of the deformable toothed washer to break the anodized layer of the solar panel frame; and further wherein tightening the lock nut causes the deformable toothed washer to transition into a deformed state in which at least one of the projections no longer extend from the depth of the recessed area.

Methods contemplated herein may further include the steps of placing the deformable toothed washer onto the mid clamp portion of the clamping device such that a raised portion of the mid clamp portion extends at least partially through a washer hole of the deformable toothed washer. Methods may include retaining the deformable toothed washer in a proper position with respect to the mid clamp portion at least partially by the raised portion.

Methods may further include resting an annular area of the deformable toothed washer into a channel of the mid clamp portion, and retaining the deformable toothed washer in a proper position with respect to the mid clamp portion at least partially by the annular area resting within the channel.

Methods may still further include gripping the solar panel frame with a plurality of ridges fashioned into one or more clamping surfaces of the mid clamp portion.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A clamping device for use with a solar panel array, comprising:
    a mid clamp portion having a recessed area, the recessed area having a perimeter and a depth, wherein the mid clamp portion includes a mid clamp hole, and wherein the mid clamp portion further includes a raised portion surrounding the mid clamp hole;
    a deformable toothed washer configured to fit within the perimeter of the recessed area, wherein the deformable toothed washer has projections that extend above the depth of the recessed area when the deformable toothed washer is in a non-deformed state, the deformable toothed washer includes a washer hole that is dimensioned to fit around the raised portion, wherein the raised portion is configured to retain the deformable toothed washer in a proper position with respect to the mid clamp portion prior to clamping; and
    a tightening mechanism configured to clamp the mid clamp portion to a solar panel frame, wherein the deformable toothed washer is configured to deform into the recessed area when the tightening mechanism clamps the mid clamp portion to the solar panel frame, wherein the projections of the deformable toothed washer are configured to break an anodized layer of the solar panel frame when the tightening mechanism clamps the mid clamp portion to the solar panel frame.

2. The clamping device of claim 1, wherein the mid clamp portion further includes a channel surrounding the raised portion, the deformable toothed washer dimensioned to at least partially fit within the channel of the mid clamp portion.

3. The clamping device of claim 2, wherein the tightening mechanism is a bolt configured to pass through the mid clamp hole.

4. The clamping device of claim 3, wherein a body of the deformable toothed washer is formed around the washer hole, and wherein the projections extend externally from the body.

5. The clamping device of claim 4, wherein the washer hole is dimensioned to fit snugly around the raised portion.

6. The clamping device of claim 5, wherein the washer hole and the mid clamp hole are circular in shape, and wherein raised portion forms a ring around the mid clamp hole, and wherein the channel forms a ring around the raised portion.

7. The clamping device of claim 6, wherein the deformable toothed washer further includes an annular area extending from the body, wherein the annular area is configured to rest into the channel.

8. The clamping device of claim 1, wherein the mid clamp portion includes a V-shaped middle portion extending along a length L of the mid clamp portion, wherein the V-shaped middle portion is be configured to occupy a space located between two clamped solar panel frames.

9. The clamping device of claim 8, wherein the mid clamp portion includes a first flat portion extending from a first side of the V-shaped middle portion in a direction perpendicular to the length of the V-shaped middle portion, and a second flat portion extending from a second side of the V-shaped middle portion parallel to the first flat portion.

10. The clamping device of claim 9, wherein at least one of the first flat portion and the second flat portion includes lengthwise ridges extending along the length.

11. A method of clamping at least one solar panel frame to a support rail, wherein the method of clamping breaks an anodized layer of at least one solar panel frame, the method comprising:
providing a support rail having a channel;
providing at least one solar panel frame having an anodized layer;
positioning the at least one solar panel frame so that the at least one solar panel frame has a surface that is substantially perpendicular to the support rail;
providing the clamping device of claim 8;
the tightening mechanism of the clamping device including a bolt having a bolt head and a threaded shaft, and a nut; inserting the bolt head into the channel of the support rail;
passing the threaded shaft through the deformable toothed washer and the mid clamp hole; and
tightening the nut on to the threaded shaft to clamp the at least one solar panel frame between the mid clamp portion and the support rail,
wherein tightening the nut causes the projections of the deformable toothed washer to break the anodized layer of the at least one solar panel frame, and
further wherein tightening the nut causes the deformable toothed washer to deform into the recessed area and transition into a deformed state.

12. The method of claim 11, wherein the mid clamp portion further includes a channel surrounding the raised portion, the deformable toothed washer dimensioned to at least partially fit within the channel of the mid clamp portion, and wherein the deformable toothed washer further includes a washer hole dimensioned to fit snugly around the raised portion, the method further comprising:
placing the deformable toothed washer onto the mid clamp portion such that the raised portion extends at least partially through the washer hole; and
retaining the deformable toothed washer in a proper position with respect to the mid clamp portion at least partially by the raised portion.

13. The method of claim 12, further comprising: wherein the washer hole and the mid clamp hole are circular in shape, and wherein raised portion forms a ring around the mid clamp hole, and wherein the channel forms a ring around the raised portion, and wherein the deformable toothed washer further includes an annular area extending from the body, wherein the annular area is configured to rest into the channel, the method further comprising:
resting the annular area of the deformable toothed washer into the channel of the mid clamp portion; and
retaining the deformable toothed washer in a proper position with respect to the mid clamp portion at least partially by the annular area resting within the channel.

14. A ground mount solar array support structure comprising:
a first vertical column having a first height extending into a ground;
a second vertical column extending into the ground and having a second height, the second height being taller than the first height;
a first horizontal beam attached to and extending across a top of the first vertical column;
a second horizontal beam attached to and extending across a top of the second vertical column;
a mounting rail located above the first and second horizontal beams, the mounting rail further extending between the first and second horizontal beams;
a solar panel having a solar panel frame, wherein the solar panel frame has an anodized layer; and
the clamping device of claim 8,
wherein tightening of the tightening mechanism secures the solar panel frame to the support rail using the clamping device,
wherein tightening of the tightening mechanism causes the projections of the deformable toothed washer to break the anodized layer of the solar panel frame, and
further wherein tightening of the tightening mechanism causes the deformable toothed washer to deform into the recessed area and transition into a deformed state.

15. The ground mount solar array support structure of claim 14, wherein the mid clamp portion further includes a channel surrounding the raised portion, the deformable toothed washer dimensioned to at least partially fit within the channel of the mid clamp portion.

16. The ground mount solar array support structure of claim 15, wherein the tightening mechanism is a bolt configured to pass through the mid clamp hole.

17. The ground mount solar array support structure of claim 16, wherein a body of the deformable toothed washer is formed around the washer hole, and wherein the projections extend externally from the body.

18. The ground mount solar array support structure of claim 17, wherein the washer hole is dimensioned to fit snugly around the raised portion.

19. The ground mount solar array support structure of claim 18, wherein the washer hole and the mid clamp hole are circular in shape, and wherein raised portion forms a ring around the mid clamp hole, and wherein the channel forms a ring around the raised portion.

20. The ground mount solar array support structure of claim 19, wherein the deformable toothed washer further includes an annular area extending from the body, wherein the annular area is configured to rest into the channel.

* * * * *